(12) United States Patent
Christenson

(10) Patent No.: US 11,592,072 B2
(45) Date of Patent: Feb. 28, 2023

(54) DYNAMIC LOAD DAMPING APPARATUS

(71) Applicant: The Boeing Company, Chicago, IL (US)

(72) Inventor: Justin Christenson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 16/893,695

(22) Filed: Jun. 5, 2020

(65) Prior Publication Data

US 2021/0381573 A1    Dec. 9, 2021

(51) Int. Cl.
| | | |
|---|---|---|
| *F16F 9/46* | (2006.01) |
| *B62D 5/07* | (2006.01) |
| *B62D 5/087* | (2006.01) |
| *B62D 6/06* | (2006.01) |

(52) U.S. Cl.
CPC .............. *F16F 9/461* (2013.01); *B62D 5/087* (2013.01); *B62D 6/06* (2013.01); *F16F 9/468* (2013.01)

(58) Field of Classification Search
CPC .......... F16F 9/461; F16F 9/468; B62D 5/087; B62D 6/06
See application file for complete search history.

(56) References Cited

U.S. PATENT DOCUMENTS 3,461,780 A * 8/1969 Schmon .................. F15B 13/04
                                                188/312
3,742,980 A * 7/1973 Byers, Jr. ............ F15B 13/0416
                                                137/625.69

4,867,476 A    9/1989 Yamanaka et al.
4,969,487 A   11/1990 Suzuki et al.
2017/0068254 A1  3/2017 Hero et al.

FOREIGN PATENT DOCUMENTS

| CN | 103032413 A | 4/2013 |
| DE | 2409523 A1 | 9/1975 |
| DE | 3638574 A1 | 5/1988 |
| DE | 4231399 A1 | 2/1994 |
| EP | 0193744 A1 | 10/1986 |
| EP | 0300496 A1 | 1/1989 |
| EP | 0424784 A2 | 5/1991 |
| GB | 1090674 | 11/1967 |

(Continued)

OTHER PUBLICATIONS

DE4231399 (A1): An English language Abstract of the foreign language document is provided herewith, which was obtained from Espacenet (http://worldwide.espacenet.com).

(Continued)

*Primary Examiner* — Adam D Tissot
(74) *Attorney, Agent, or Firm* — Quinn IP Law

(57) ABSTRACT

A dynamic load damping apparatus is employed in a hydraulic steering system control circuit of an aircraft. The dynamic load damping apparatus is positioned in the hydraulic steering system control circuit in parallel with a control valve of the control circuit that functions as the hydraulic fluid source of the control circuit and an actuator that controls movements of a nose gear of the aircraft. The dynamic load damping apparatus dampens loads transmitted to the hydraulic actuator that controls the steering movements of the nose gear on the aircraft.

20 Claims, 3 Drawing Sheets

(56) References Cited

FOREIGN PATENT DOCUMENTS

| | | |
|---|---|---|
| JP | H07238577 | 12/1995 |
| WO | 8900512 A2 | 1/1989 |
| WO | 9012700 A2 | 11/1990 |
| WO | 9302880 A1 | 2/1993 |

OTHER PUBLICATIONS

DE2409523 (A1): An English language Abstract of the foreign language document is provided herewith, which was obtained from Espacenet (http://worldwide.espacenet.com).
CN103032413 (A): An English language Abstract of the foreign language document is provided herewith, which was obtained from Espacenet (http://worldwide.espacenet.com).
JPH07238577: An English language Abstract of the foreign language document is provided herewith, which was obtained from Espacenet (http://worldwide.espacenet.com).
EP0424784 (A2): An English language Abstract of the foreign language document is provided herewith, which was obtained from Espacenet (http://worldwide.espacenet.com).

\* cited by examiner

DYNAMIC LOAD DAMPING APPARATUS

FIELD

This disclosure pertains to a dynamic load damping apparatus (DLD) in a hydraulic steering system of an aircraft. The dynamic load damping apparatus is positioned in the hydraulic circuit of the hydraulic steering system in parallel with the hydraulic actuator and functions to control the load on the aircraft steering system and improve the nose gear shimmy stability.

BACKGROUND

Hydraulic actuators are used in controlling the steering movements of an aircraft nose gear. These hydraulic actuators are often subjected to heavy loads from the nose gear of the aircraft travelling over a surface when taxiing to and from a runway and when traveling down a runway on aircraft takeoff and aircraft landing.

Various different hydraulic steering system control circuits have been developed to dampen the loads transmitted to the hydraulic actuator that controls the steering movements of the nose gear of an aircraft. Many of the existing hydraulic steering control circuits have complicated constructions that contribute to the costs involved in manufacturing the hydraulic steering system control circuits and in maintaining the hydraulic steering system control circuits.

SUMMARY

The dynamic load damping apparatus of this disclosure has a simplified construction that reduces the cost of manufacturing a hydraulic steering system control circuit employing the dynamic load damping apparatus.

The dynamic load damping apparatus of this disclosure includes a dynamic load damper spool valve that is part of a hydraulic steering system control circuit in a circuit housing. The spool valve is the only valve employed by the dynamic load damping apparatus, simplifying its construct and thereby reducing its cost of manufacture.

The dynamic load damping apparatus also includes a sleeve as part of the hydraulic circuit in the housing. The sleeve has a cylindrical interior surface that defines an interior bore that extends between a first end of the sleeve and a second end of the sleeve. The first end of the sleeve and the second end of the sleeve are at opposite ends of the sleeve.

The interior bore has a first portion at a first end of the interior bore adjacent the first end of the sleeve. The first portion of the interior bore has a first interior diameter dimension.

The interior bore has a second portion at a second end of the interior bore adjacent the second end of the sleeve. The second portion of the interior bore has a second interior diameter dimension.

The interior bore also has a third portion. The third portion of the interior bore is positioned between the first portion of the interior bore and the second portion of the interior bore. The third portion of the interior bore has a third interior diameter dimension. The third interior diameter dimension is larger than the first interior diameter dimension of the first portion of the interior bore and is larger than the second interior diameter dimension of the second portion of the interior bore.

The spool valve of the dynamic load damping apparatus is positioned in the interior bore of the sleeve. The spool valve has a first land at a first end of the spool valve. The first land is adjacent the first end of the sleeve and is positioned in the first portion of the interior bore of the sleeve.

The spool valve has a second land at a second end of the spool valve. The second land is positioned adjacent the second end of the sleeve and in the second portion of the interior bore of the sleeve.

The spool valve has a third land at an intermediate portion of the spool valve between the first land and the second land. The third land of the spool valve is positioned in the third portion of the interior bore of the sleeve.

The spool valve has a first groove that extends around the spool valve between the first land and the third land. The spool valve also has a second groove that extends around the spool valve between the second land and the third land.

A first restricted conduit extends across the first land. The first restricted conduit provides fluid communication between the first groove around the spool valve and the first end of the interior bore. The first restricted conduit could extend across the exterior surface of the first land, or could extend through the first land between the first groove in the interior bore of the sleeve and the first end of the interior bore of the sleeve. Alternatively, the first restricted conduit could extend from the first portion of the interior bore of the sleeve at the first groove of the spool valve, through the housing, and back to the first portion of the interior bore at the first end of the sleeve.

A second restricted conduit extends across the second land. The second restricted conduit provides fluid communication between the second groove and the second end of the interior bore. The second restricted conduit could extend across the exterior surface of the second land, or could extend through the second land between the second groove in the interior bore of the sleeve and the second end of the interior bore of the sleeve. Alternatively, the second restricted conduit could also extend from the second portion of the interior bore of the sleeve at the second groove of the spool valve, through the housing, and back to the second portion of the interior bore at the second end of the sleeve.

A first control conduit communicates with the first groove in the first portion of the interior bore of the sleeve. A second control conduit communicates with the second groove in the second portion of the interior bore of the sleeve. The first control conduit and the second control conduit both communicate with a control valve.

A first actuator conduit communicates with the first groove in the first portion of the interior bore of the sleeve. A second actuator conduit communicates with the second groove in the second portion of the interior bore of the sleeve. The first actuator conduit and the second actuator conduit communicate with an actuator sleeve.

The actuator sleeve has an interior bore that extends between a first end of the actuator sleeve and a second end of the actuator sleeve. The first end of the actuator sleeve and the second end of the actuator sleeve are at opposite ends of the actuator sleeve.

An actuator piston is positioned in the interior bore of the actuator sleeve. The first actuator conduit communicates with the interior bore of the actuator sleeve between the first end of the actuator sleeve and the actuator piston. The second actuator conduit communicates with the interior bore of the actuator sleeve between the second end of the actuator sleeve and the actuator piston.

The first control conduit, the second control conduit, the first actuator conduit and the second actuator conduit each have a cross-section area that is larger than a cross-section area of the first restricted conduit and is larger than a cross-section area of the second restricted conduit.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

Further features of the dynamic load damping apparatus are set forth in the following detailed description of the apparatus and in the following drawing figures.

DETAILED DESCRIPTION

Figure 1:
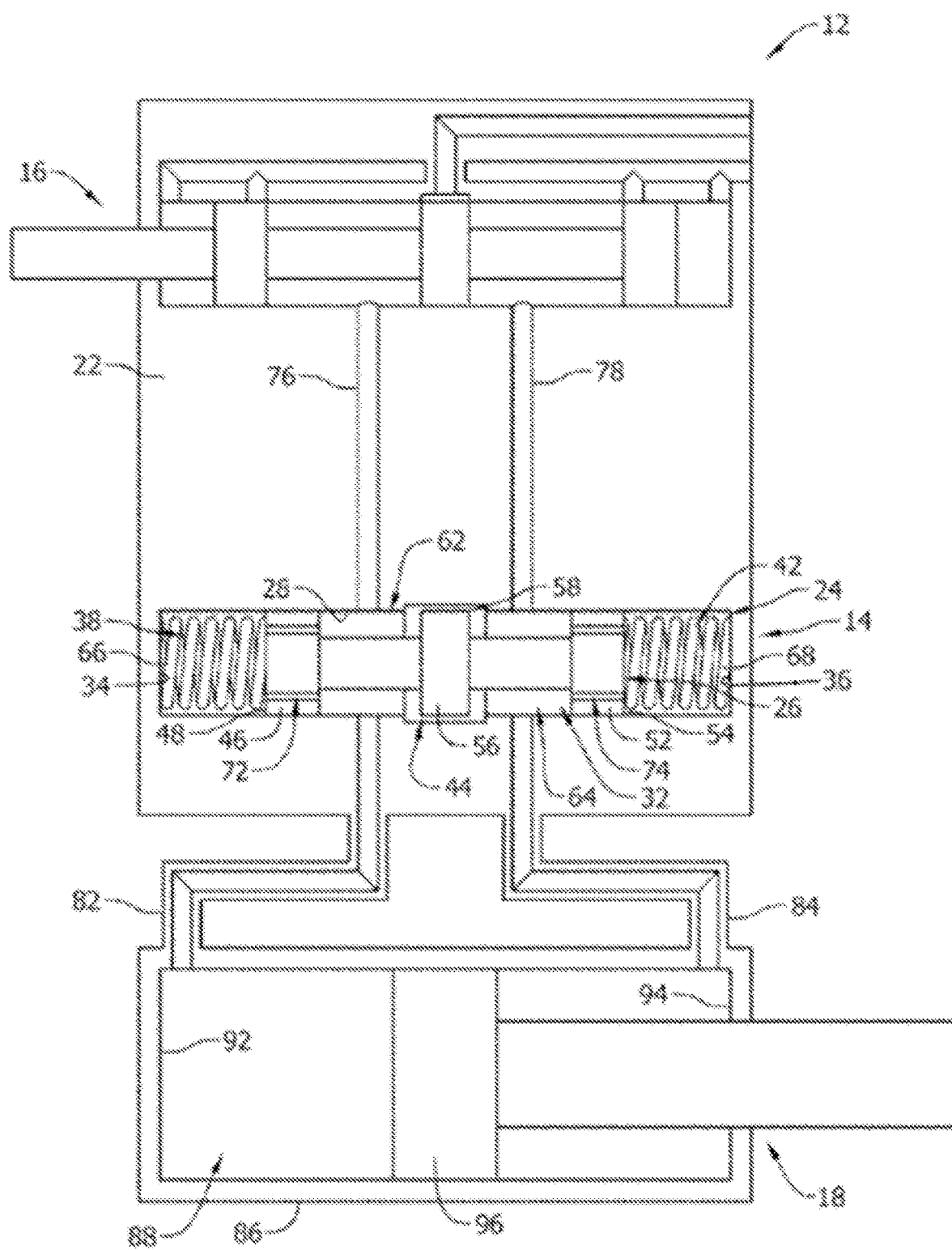
FIG. 1 is a schematic representation of a hydraulic steering system circuit that employs the dynamic load damping apparatus of this disclosure.

FIG. 1 is a schematic representation of a hydraulic steering system control circuit 12 that employs the dynamic load damping apparatus 14 of this disclosure. The dynamic load damping apparatus 14 controls a flow of hydraulic fluid under pressure between a control valve 16 that functions as the hydraulic fluid source, and an actuator 18, The hydraulic actuator 18 controls the steering movements of an aircraft nose gear.

The hydraulic actuator 18 could be employed to control the mechanical movements of other component parts of an aircraft, or of some other type of vehicle or apparatus. The hydraulic actuator 18 could be one of several actuators that communicate with the dynamic load damping apparatus 14. Additionally, the control valve 16 could be one of several control valves that communicate with the dynamic load damping apparatus 14.

As represented in FIG. 1, the dynamic load damping apparatus 14, the control valve 16 and the actuator 18 are the basic component parts of the hydraulic steering system control circuit 12. The dynamic load damping apparatus 14 and the control valve 16 are represented in FIG. 1 as being constructed in a housing 22. The housing 22 is constructed of a material that provides sufficient strength for the intended functioning of the hydraulic steering system control circuit 12. For example, the housing 22 could be constructed of a metal such as aluminum, or other equivalent metal material. The housing 22 could also be constructed of a material having properties equivalent to those of a metal material.

The actuator 18 would be located remotely from the housing 22. In the example of the dynamic load damping apparatus 14 being used to dampen heavy loads exerted on a nose gear on an aircraft, the actuator 18 would be located in proximity to the nose gear of the aircraft.

As represented in FIG. 1, the dynamic load damping apparatus 14 is basically comprised of a sleeve 24 in the housing 22 and a spool valve 26 contained in the sleeve 24.

The sleeve 24 has a cylindrical interior surface 28 that defines an interior bore 32 of the sleeve 24. The sleeve interior surface 28 and the sleeve interior bore 32 extend between a first end of the sleeve 24 defined by a circular first end wall 34 and a second end of the sleeve 24 defined by a circular second end wall 36. The first end wall 34 of the sleeve 24 and the second end wall 36 of the sleeve 24 are at opposite ends of the sleeve 24.

The interior bore 32 has a first portion 38 at a first end of the interior bore 32 adjacent the first end wall 34 of the sleeve 24. The first portion 38 of the interior bore 32 has a first interior diameter dimension.

The interior bore 32 has a second portion 42 at the second end of the interior bore adjacent the second end wall 36 of the sleeve 24. The second portion 42 of the interior bore 32 has a second interior diameter dimension. The first interior diameter dimension of the first portion 38 of the sleeve interior bore and the second interior diameter dimension of the second portion 42 of the sleeve interior bore are equal.

The sleeve interior bore 32 has a third portion 44. The third portion 44 of the interior bore 32 is positioned between the first portion 38 of the interior bore and the second portion 42 of the interior bore. The third portion 44 of the interior bore 32 has a third interior diameter dimension. The third interior diameter dimension is larger than the first interior diameter dimension of the first portion 38 of the interior bore 32 and is larger than the second interior diameter dimension of the second portion 42 of the interior bore 32.

Figure 2:
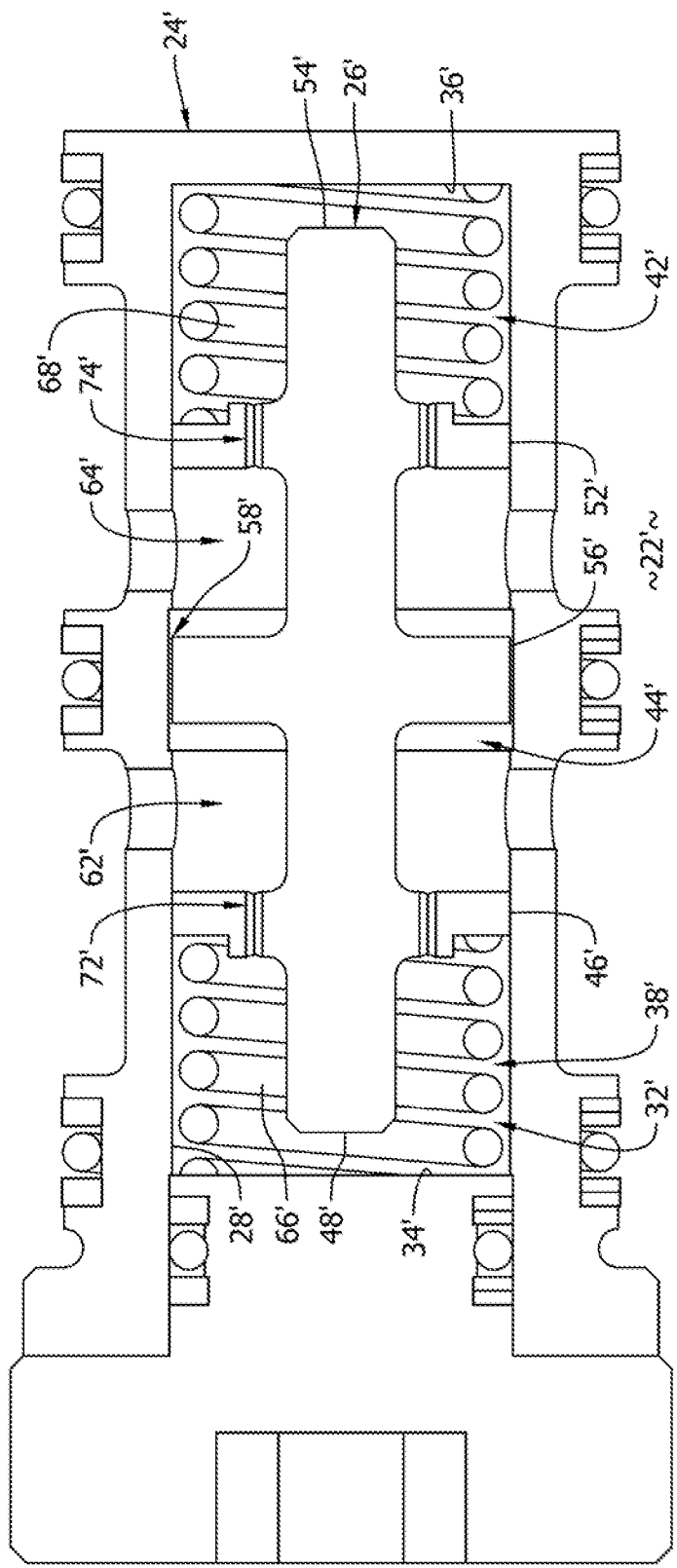
FIG. 2 is a schematic representation of an enlarged view of the spool valve of the dynamic load damping apparatus of FIG. 1.

As represented in FIG. 1, the spool valve 26 of the dynamic load damping apparatus 14 is positioned in the interior bore 32 of the sleeve 24. FIG. 2 is a representation of an enlarged view of the spool valve 26.

The spool valve 26 has a first land 46 at a first end 48 of the spool valve 26. The first land 46 is positioned in the first portion 38 of the interior bore 32 adjacent the first end wall 34 of the sleeve 24. The first land 46 has a cylindrical exterior surface that is dimensioned to fit in sliding, sealing engagement with the interior surface 28 of the sleeve 24 in the first portion 38 of the sleeve interior bore 32.

The spool valve 26 has a second land 52 at a second end 54 of the spool valve 26. The second land 52 is positioned in the second portion 42 of the interior bore 32 of the sleeve 24 adjacent the second end wall 36 of the sleeve 24, The second land 52 has a cylindrical exterior surface that is dimensioned to fit in sliding, sealing engagement with the interior surface 28 of the sleeve 24 in the second portion 42 of the sleeve interior bore 32.

The spool valve 26 has a third land 56 at an intermediate portion of the spool valve 26 between the first land 46 and the second land 52. The third land 56 of the spool valve 26 is positioned in the third portion 44 of the sleeve interior bore 32. The third land 56 has a cylindrical exterior surface. The cylindrical exterior surface of the third land 56 has a diameter dimension that is a same diameter dimension as the cylindrical exterior surface of the first land 46 and the same diameter dimension as the cylindrical exterior surface of the second land 52. As represented in FIG. 1, because the diameter dimension of the third portion 44 of the sleeve interior bore 32 is larger than the interior diameter dimension of the first portion 38 of the interior bore 32 and is larger than the interior diameter dimension of the second portion 42 of the interior bore 32, there is a small, annular spacing that forms a restricted fluid passageway between the cylindrical exterior surface of the third land 56 and the cylindrical interior surface of the third portion 44 of the sleeve interior bore 32. The annular spacing between the cylindrical exterior surface of the third land 56 and the cylindrical interior surface of the third portion 44 of the sleeve interior bore 32 defines an annular restricted passageway 58 around the third land 56.

The spool valve 26 is also constructed with two annular grooves. The spool valve 26 has a first groove 62 that extends around the spool valve between the first land 46 and the third land 56. The spool valve 26 also has a second groove 64 that extends around the spool valve between the second land 52 and the third land 56.

A first spring 66 is positioned in the bore first portion 38. The first spring 66 is represented as a coil spring in FIG. 1, but could be any other type of equivalent spring. The first spring 66 engages against the first end wall 34 of the sleeve 24 and against the first end 48 of the spool valve.

A second spring 68 is positioned in the bore second portion 42. The second spring 68 is represented as a coil spring in FIG. 1, but could be any other type of equivalent spring. The second spring 68 engages against the second end wall 36 of the sleeve 24 and against the second end 54 of the spool valve. The first spring 66 and the second spring 68 have a same spring rate. The first spring 66 and the second spring 68 center the spool valve 26 in the sleeve interior bore 32.

Figure 3:
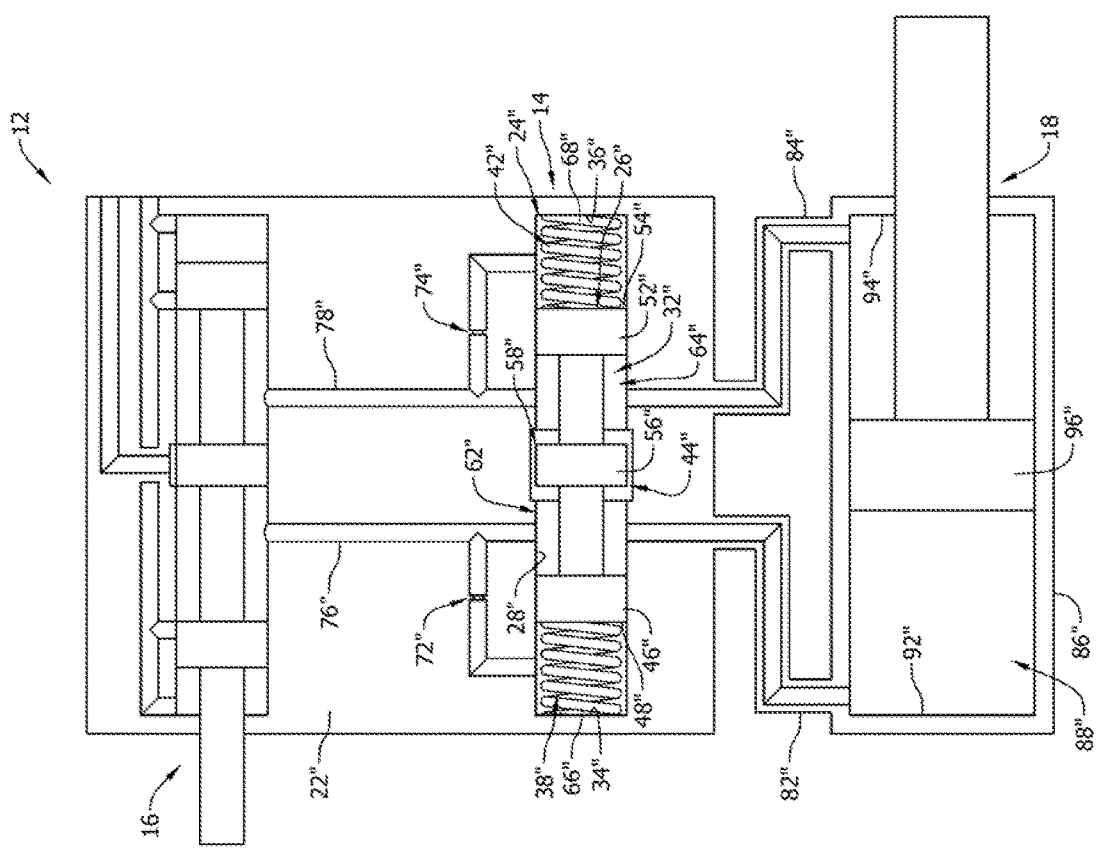
FIG. 3 is a schematic representation of an alternate embodiment of the hydraulic steering system circuit that comprises a first restricted conduit extending across the spool valve and a second restricted conduit extending across the spool valve that are both not part of the spool valve.

A first restricted conduit 72 extends across the first land 46. The first restricted conduit 72 provides fluid communication between the first groove 62 around the spool valve 26 and the first portion 38 of the interior bore 32 adjacent the first end wall 34 of the sleeve 24. The first restricted conduit 72 could be one or more grooves or channels formed across the exterior surface of the first land 46 as represented in FIG. 1. The first restricted conduit 72' could be one or more restricted conduits extending through the first land 46' between the first groove 62' and the first portion 38' of the interior bore 32' adjacent the first end wall 34' of the sleeve 24' as represented in FIG. 2. Alternatively, the first restricted conduit 72" could be a conduit containing a restriction orifice that extends from the first portion 38" of the interior bore 32" of the sleeve 34" at the first groove 62" of the spool valve 26", through the housing 22", and back to the first portion 38" of the interior bore 32" adjacent the first end wall 34" of the sleeve 24" as represented in FIG. 3.

A second restricted conduit 74 extends across the second land 52. The second restricted conduit 74 provides fluid communication between the second groove 64 around the spool valve and the second portion 42 of the interior bore 32 adjacent the second end wall 36 of the sleeve 24. The second restricted conduit 74 could be one or more grooves or channels formed across the exterior surface of the second land 52 as represented in FIG. 1. The second restricted conduit 74' could be one or more restricted conduits extending through the second land 52' between the second groove 64' and the second portion 4T of the interior bore 32' adjacent the second end wall 36' of the sleeve 24' as represented in FIG. 2. Alternatively, the second restricted conduit 74" could be a conduit containing a restriction orifice that extends from the second portion 42" of the interior bore 32" of the sleeve 24" at the second groove 64" of the spool valve 26", through the housing 22", and back to the second portion 42" of the interior bore 32" adjacent the second end wall 36" of the sleeve 24" as represented in FIG. 3.

The spring rate of the first spring 66 and the second spring 68, the cross-sectional areas of the first restricted conduit 72 and the second restricted conduit 74, the cross-sectional areas of the first restricted conduit 72' and second restricted conduit 74, and the cross-sectional areas of the first restricted conduit 72" and the second restricted conduit 74" could be changed and adjusted to tune the dynamic load damping apparatus 14 to different frequencies of oscillations.

A first control conduit 76 communicates with the first groove 62 in the first portion 38 of the sleeve interior bore 32. A second control conduit 78 communicates with the second groove 64 in the second portion 42 of the sleeve interior bore 32. The first control conduit 76 and the second control conduit 78 both communicate with the control valve 16.

A first actuator conduit 82 communicates with the first groove 62 in the first portion 38 of the sleeve interior bore 32. A second actuator conduit 84 communicates with the second groove 64 in the second portion 42 of the sleeve interior bore 32. The first actuator conduit 82 and the second actuator conduit 84 communicate with the actuator 18.

The actuator 18 is basically comprised of an actuator sleeve 86. The actuator sleeve 86 has an interior bore 88 that extends between a first end 92 of the actuator sleeve 86 and an opposite second end 94 of the actuator sleeve 86. The first end 92 of the actuator sleeve 86 and the second end 94 of the actuator sleeve 86 are at opposite ends of the actuator sleeve 86.

An actuator piston 96 is positioned in the interior bore 88 of the actuator sleeve 86. The first actuator conduit 82 communicates with the interior bore 88 of the actuator sleeve 86 between the first end 92 of the actuator sleeve 86 and the actuator piston 96. The second actuator conduit 84 communicates with the interior bore 88 of the actuator sleeve 86 between the second end 94 of the actuator sleeve 86 and the actuator piston 96.

The first control conduit 76, the second control conduit 78, the first actuator conduit 82 and the second actuator conduit 84 each have a cross-section area that is larger than a cross-section area of the first restricted conduits 72, 72', 72" and is larger than the cross-section area of the second restricted conduits 74, 74', 74".

The operation of the dynamic load damping apparatus 14 is the same for each of the three variations of the first restricted conduit 72, 72', 72" and the second restricted conduit 74, 74', 74" described earlier and represented in FIGS. 1, 2 and 3. Therefore, the operation of the dynamic load damping apparatus 14 in the hydraulic steering control circuit 12 represented in FIG. 1 will be described.

As represented in FIG. 1, the spool valve 26 is centered in the interior bore 32 of the sleeve 24 by the first spring 66 and the second spring 68 engaging against the respective first end 48 of the spool valve 26 and the second end 54 of the spool valve 26. As stated earlier, the first spring 66 and the second spring 68 have an equal spring rate. In the centered position of the spool 26 in the interior bore 32 of the sleeve 24, the third land 56 of the spool valve 26 is surrounded by the third portion 44 of the sleeve interior bore 32. Should fluid under pressure be supplied by the first control conduit 76 to the interior bore 32 of the sleeve 24, the fluid pressure would pass through the restricted passage 58 around the third land 56 and then through the second control conduit 78 to a system return of the fluid pressure. Thus, with the spool valve 26 positioned as represented in FIG. 1, the first control conduit 76 and second control conduit 78 are short circuited and the actuator 18 is bypassed by the fluid under pressure supplied through the first control conduit 76.

The same situation occurs as fluid under pressure is supplied through the second control conduit 78 to the interior bore 32 of the sleeve 24. The fluid under pressure supplied through the second control conduit 78 passes through the restricted passage 58 around the third land 56 and returns to a system return through the first control conduit 76. Again, the actuator 18 is bypassed by the fluid under pressure supplied through the second control conduit 78 to the interior bore 32 of the sleeve 24 which returns to the system return through the first control conduit 76.

When the spool valve 26 is deflected sufficiently to the right as represented in FIG. 1, a sufficient distance to cause the third land 56 to move into the second portion 42 of the interior bore 32, the flow of fluid pressure bypassing the actuator 18 is blocked and the flow of fluid pressure through the first control conduit 76 passes through the sleeve 24 to the first actuator conduit 82 and to the left side of the actuator 18 as represented in FIG. 1. When the spool valve 26 is moved sufficiently to the left to where the third land 56 enters into the first portion 38 of the interior bore 32 of the sleeve 24, for example by fluid pressure supplied to the sleeve 24 through the second control conduit 78, the bypass of the actuator 18 is blocked by the third land 56. The flow of fluid pressure through the second control conduit 78 passes through the interior bore 32 of the sleeve 24 and through the second actuator conduit 84 to the right side of the actuator 18 as represented in FIG. 1. As described above, the hydraulic steering system control circuit 12 functions normally, with all of the fluid pressure either being controlled to flow to the left side of the actuator 18 or the right side of the actuator 18 as represented in FIG. 1.

The deflection or movement of the spool valve 26 either to the right or left as represented in FIG. 1 is caused whenever an imbalance in the fluid pressure is created in the first control conduit 76 or the second control conduit 78. An imbalance in fluid pressure between the first control conduit 76 and the second control conduit 78 can be created as a result of a mechanical control input to the control valve 16 that causes the control valve 16 to move to the right or to the left as represented in FIG. 1. Imbalance in fluid pressure between the first control conduit 76 and the second control conduit 78 can also be created as a result of an application of an external load to the actuator 18 which causes the actuator piston 96 to move to the left or to the right as represented in FIG. 1. For example, if there is a pressure imbalance between the first control conduit 76 and the second control conduit 78 with the first control conduit 76 having a higher fluid pressure than in the second control conduit 78, the higher fluid pressure in the first control conduit 76 is fed through the first restricted conduit 72 into the first portion 38 of the sleeve interior bore 32 between the sleeve first end wall 34 and the first end 48 of the spool valve 26. This causes the spool valve 26 to move to the right as viewed in FIG. 1. If the imbalance in fluid pressure is created by the fluid pressure in the second control conduit 78 being larger than the fluid pressure in the first control conduit 76, the higher fluid pressure is fed from the second control conduit 78 through the second restricted conduit 74 to the second portion 42 of the interior bore 32 between the second end wall 36 of the sleeve 24 and the second end 54 of the spool valve 26. This causes the spool valve 26 to move to the left as viewed in FIG. 1.

When the pressure imbalance between the first control conduit 76 and the second control conduit 78, or between the first actuator conduit 82 and the second actuator conduit 84 are steady state or low frequency oscillations, the spool valve 26 moves according to whether the greater fluid pressure is in the first control conduit 76 or the second control conduit 78, or whether the greater fluid pressure is in the first actuator conduit 82 or the second actuator conduit 84, In this mode of operation, the fluid pressure fed through the first restricted conduit 72 or the second restricted conduit 74 is roughly in phase with and equal to the fluid pressure in the first control conduit 76 or the second control conduit 78, respectively. This results in the dynamic load damping apparatus 14 functioning normally, with only a small amount of lag time created by the time it takes for the spool valve 26 to move far enough to the right or to the left to cut off the bypass around the third land 56 described above.

If an unsteady, high frequency load is applied to the actuator 18, or a rapid control input is applied to the control valve 16, a high frequency fluid pressure change results in the first control conduit 76 or the second control conduit 78. This high frequency fluid pressure change is fed through the first restricted conduit 72 or the second restricted conduit 74, respectively, as described above. However, the high frequency fluid pressure change causes a pressure drop to occur across the first restricted conduit 72 or the second restricted conduit 74, respectively. This delays the arrival of the high frequency fluid pressure through the first restricted conduit 72 to the first portion 38 of the sleeve interior bore 32, or through the second restricted conduit 74 to the second portion 42 of the sleeve interior bore 32. This is in turn reduces the amplitude of the fluid pressure change in the first portion 38 of the sleeve interior bore 32 or the second portion 42 of the sleeve interior bore 32, respectively. As a result, the movement of the spool valve 26 to the right or to the left, respectively, is out of phase with the change in fluid pressure in the first control conduit 76 or the second control conduit 78 and the movement of the sleeve valve 26 is insufficient to cut off or block the fluid bypass flow through the third portion 44 of the sleeve interior bore 32 and around the restricted passage 58 around the third land 56.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A dynamic load damping apparatus comprising:
   a housing;
   a sleeve disposed in the housing, the sleeve having an interior bore that extends between a first end of the sleeve and a second end of the sleeve, the first end of the sleeve and the second end of the sleeve being at opposite ends of the sleeve;
   a spool valve disposed in the interior bore of the sleeve, the spool valve having a first land at a first end of the spool valve, the first land being adjacent to the first end of the sleeve, the spool valve having a second land at a second end of the spool valve, the second land being adjacent to the second end of the sleeve;
   wherein the spool valve has a third land at an intermediate portion of the spool valve between the first land and the second land;
   a first restricted conduit extends across the first land;
   a second restricted conduit extends across the second land; and,
   wherein the third land and the interior bore of the sleeve define an annular restricted passageway extending across the third land to provide fluid communication from one side of the third land to another side of the third land when the spool valve is centered inside of the interior bore of the sleeve.

2. The apparatus of claim 1, wherein:
the first restricted conduit extends through and across the first land; and,
the second restricted conduit extends through and across the second land.

3. The apparatus of claim 1, further comprising:
a first spring disposed in the interior bore of the sleeve, the first spring being positioned between the first end of the sleeve and the first land of the spool valve; and,
a second spring disposed in the interior bore of the sleeve, the second spring being positioned between the second end of the sleeve and the second land of the spool valve.

4. The apparatus of claim 1, wherein:
the spool valve defines a first groove between the first land and the third land;
the spool valve defines a second groove between the second land and the third land;
the first restricted conduit provides fluid communication between the first groove and the first end of the sleeve;
the second restricted conduit provides fluid communication between the second groove and the second end of the sleeve; and
the annular restricted passageway provides fluid communication between the first groove and the second groove.

5. The apparatus of claim 4, further comprising:
a first control conduit in fluid communication with the first groove in the interior bore of the sleeve; and,
a first actuator conduit in fluid communication with the first groove in the interior bore of the sleeve.

6. The apparatus of claim 5, further comprising:
a second control conduit in fluid communication with the second groove in the interior bore of the sleeve; and,
a second actuator conduit in fluid communication with the second groove in the interior bore of the sleeve.

7. The apparatus of claim 6, wherein:
the first control conduit, the second control conduit, the first actuator conduit and the second actuator conduit each have a cross-section area that is larger than a cross-section area of the first restricted conduit and is larger than a cross-section area of the second restricted conduit.

8. The apparatus of claim 6:
further comprising an actuator sleeve defining an interior bore that extends between a first end of the actuator sleeve and a second end of the actuator sleeve, the first end of the actuator sleeve and the second end of the actuator sleeve being at opposite ends of the actuator sleeve;
further comprising an actuator piston disposed in the interior bore of the actuator sleeve;
wherein the first actuator conduit is in fluid communication with the interior bore of the actuator sleeve between the first end of the actuator sleeve and the actuator piston; and,
wherein the second actuator conduit is in fluid communication with the interior bore of the actuator sleeve between the second end of the actuator sleeve and the actuator piston.

9. The apparatus of claim 8:
further comprising a control valve;
wherein the first control conduit is in fluid communication with the control valve; and,
wherein the second control conduit is in fluid communication with the control valve.

10. A dynamic load damping apparatus comprising:
a housing;
a sleeve disposed in the housing, the sleeve having an interior bore that extends between a first end of the sleeve and a second end of the sleeve, the first end of the sleeve and the second end of the sleeve being at opposite ends of the sleeve, the interior bore having a first portion adjacent to the first end of the sleeve, the first portion of the interior bore having a first interior diameter dimension, the interior bore having a second portion adjacent to the second end of the sleeve, the second portion of the interior bore having a second interior diameter dimension, the interior bore having a third portion, the third portion of the interior bore being between the first portion of the interior bore and the second portion of the interior bore, the third portion of the interior bore having a third interior diameter dimension, the third interior diameter dimension being larger than the first interior diameter dimension and the second interior diameter dimension, the third portion of the interior bore is closed to outside of the sleeve;
a spool valve disposed in the interior bore of the sleeve, the spool valve having a first land at a first end of the spool valve, the first land being adjacent to the first end of the sleeve and disposed in the first portion of the interior bore of the sleeve, the spool valve having a second land at a second end of the spool valve, the second land being adjacent to the second end of the sleeve and disposed in the second portion of the interior bore of the sleeve;
a first restricted conduit extends across the first land; and,
a second restricted conduit extends across the second land.

11. The apparatus of claim 10, wherein:
the first restricted conduit extends through and across the first land; and,
the second restricted conduit extends through and across the second land.

12. The apparatus of claim 10, further comprising:
a first spring disposed in the first portion of the interior bore of the sleeve, the first spring being positioned between the first end of the sleeve and the first land of the spool valve; and,
a second spring disposed in the second portion of the interior bore of the sleeve, the second spring being positioned between the second end of the sleeve and the second land of the spool valve.

13. The apparatus of claim 10, wherein:
the spool valve has a third land at an intermediate portion of the spool valve between the first land and the second land, the third land of the spool valve being positioned in the third portion of the interior bore of the sleeve;
the spool valve defines a first groove between the first land and the third land;
the spool valve defines a second groove between the second land and the third land;
the first restricted conduit is in fluid communication with the first groove and the first end of the sleeve; and,
the second restricted conduit is in fluid communication with the second groove and the second end of the sleeve.

14. The apparatus of claim 13, further comprising:
a first control conduit in fluid communication with the first groove in the first portion of the interior bore of the sleeve; and,
a first actuator conduit in fluid communication with the first groove in the first portion of the interior bore of the sleeve.

15. The apparatus of claim 14, further comprising:
a second control conduit in fluid communication with the second groove in the second portion of the interior bore of the sleeve; and,
a second actuator conduit in fluid communication with the second groove in the second portion of the interior bore of the sleeve.

16. The apparatus of claim 15, wherein:
the first control conduit, the second control conduit, the first actuator conduit and the second actuator conduit each have a cross-section area that is larger than a cross-section area of the first restricted conduit and is larger than a cross-section area of the second restricted conduit.

17. The apparatus of claim 15, further comprising:
further comprising an actuator sleeve defining an interior bore that extends between a first end of the actuator sleeve and a second end of the actuator sleeve, the first end of the actuator sleeve and the second end of the actuator sleeve being at opposite ends of the actuator sleeve;
further comprising an actuator piston disposed in the interior bore of the actuator sleeve;
wherein the first actuator conduit is in fluid communication with the interior bore of the actuator sleeve between the first end of the actuator sleeve and the actuator piston; and,
wherein the second actuator conduit is in fluid communication with the interior bore of the actuator sleeve between the second end of the actuator sleeve and the actuator piston.

18. The apparatus of claim 17:
further comprising a control valve;
wherein the first control conduit in fluid communication with the control valve; and,
wherein the second control conduit in fluid communication with the control valve.

19. A method of damping dynamic loads in a hydraulic actuator, the method comprising:
positioning a spool valve into an interior bore of a sleeve between a first end of the interior bore of the sleeve and a second end of the interior bore of the sleeve, the interior bore of the sleeve having a first portion adjacent to the first end of the sleeve and a second portion adjacent to the second end of the sleeve;
positioning a first land at a first end of the spool valve adjacent to the first end of the sleeve within the first portion of the interior bore of the sleeve;
positioning a second land at a second end of the spool valve adjacent to the second end of the sleeve within the second portion of the interior bore of the sleeve;
communicating the first portion of the interior bore of the sleeve with an interior bore of an actuator on a first side of a piston within the interior bore of the actuator;
communicating the second portion of the interior bore of the sleeve with the interior bore of the actuator on a second side of the piston within the interior bore of the actuator;
extending a first restricted conduit across the first land of the spool valve;
extending a second restricted conduit across the second land of the spool valve;
communicating the first portion of the interior bore of the sleeve with the actuator through a first actuator conduit, the first actuator conduit having a cross-section area that is larger than a cross-section area of the first restricted conduit;
communicating the second portion of the interior bore of the sleeve with the actuator through a second actuator conduit, the second actuator conduit having a cross-section area that is larger than a cross-section area of the second restricted conduit; and,
positioning a third land at an intermediate portion of the spool valve between the first land and the second land, wherein the third land and the interior bore of the sleeve define an annular restricted passageway extending across the third land to provide fluid communication from one side of the third land to another side of the third land when the spool valve is centered inside of the interior bore of the sleeve.

20. The apparatus of claim 1, wherein:
the one side of the third land is further defined as a first side and the another side of the third land is further defined as a second side that opposes the first side of the third land;
the first land includes a first side and a second side that opposes the first side of the first land;
the second land includes a first side and a second side that opposes the first side of the second land;
the spool valve defines a first groove and a second groove spaced from each other;
the first side of the first land and the first side of the third land define a boundary of the first groove;
the first side of the second land and the second side of the third land define a boundary of the second groove;
the interior bore has a first portion adjacent to the first end of the sleeve;
the interior bore has a second portion adjacent to the second end of the sleeve;
the first end of the sleeve and the second end of the sleeve are spaced from each other;
the first restricted conduit extends across the first land between the first side of the first land and the second side of the first land to provide fluid communication between the first groove and the first portion of the interior bore of the sleeve; and,
the second restricted conduit extends across the second land between the first side of the second land and the second side of the second land to provide fluid communication between the second groove and the second portion of the interior bore of the sleeve.

* * * * *